(12) United States Patent
Nakajima et al.

(10) Patent No.: US 10,632,791 B2
(45) Date of Patent: Apr. 28, 2020

(54) TIRE

(71) Applicants: SUMITOMO ELECTRIC TOCHIGI CO., LTD., Utsunomiya-shi (JP); Sumitomo Electric Industries, Ltd., Osaka-shi (JP); SUMITOMO RUBBER INDUSTRIES, LTD., Kobe-shi (JP); NIPPON STEEL CORPORATION, Tokyo (JP)

(72) Inventors: Tetsuya Nakajima, Utsunomiya (JP); Kenichi Yamashita, Utsunomiya (JP); Takashi Tokuyama, Utsunomiya (JP); Shinei Takamura, Itami (JP); Masumi Suzuki, Kobe (JP); Koji Fujisawa, Kobe (JP)

(73) Assignees: Sumitomo Electric Tochigi Co., Ltd., Utsunomiya-shi (JP); Sumitomo Electric Industries, Ltd., Osaka-shi (JP); Sumitomo Rubber Industries, Ltd., Kobe-shi (JP); Nippon Steel Corporation, Tokyo (JP)

( * ) Notice: Subject to any disclaimer, the term of this patent is extended or adjusted under 35 U.S.C. 154(b) by 100 days.

(21) Appl. No.: 15/768,719

(22) PCT Filed: Oct. 13, 2016

(86) PCT No.: PCT/JP2016/080449
§ 371 (c)(1),
(2) Date: Apr. 16, 2018

(87) PCT Pub. No.: WO2017/065243
PCT Pub. Date: Apr. 20, 2017

(65) Prior Publication Data
US 2018/0304689 A1    Oct. 25, 2018

(30) Foreign Application Priority Data

Oct. 16, 2015 (JP) .................. 2015-204895

(51) Int. Cl.
*B60C 9/00* (2006.01)
*D07B 1/06* (2006.01)
*B60C 1/00* (2006.01)

(52) U.S. Cl.
CPC .............. *B60C 9/0007* (2013.01); *B60C 1/00* (2013.01); *B60C 9/00* (2013.01); *D07B 1/06* (2013.01);
(Continued)

(58) Field of Classification Search
CPC ........... B60C 1/00; B60C 9/00; B60C 9/0007; B60C 2009/14; B60C 9/20;
(Continued)

(56) References Cited

U.S. PATENT DOCUMENTS

2012/0067485 A1*   3/2012   Imhoff .................... B29B 15/08
152/451

FOREIGN PATENT DOCUMENTS

CN        103814159 A    5/2014
EP        1205315 A2     5/2002
(Continued)

OTHER PUBLICATIONS

Fulton, W.S. Tire Cord Adhesion—Interface Morphology and the Influence of Cobalt, Tire Technology International, 2004.*
(Continued)

*Primary Examiner* — Camie S Thompson
(74) *Attorney, Agent, or Firm* — Baker Botts L.L.P.; Michael A. Sartori

(57) ABSTRACT

A tire having a rubber body in which a steel cord is embedded, wherein a layer composed of $Zn_xCo_yO$ is formed at the interface between the steel cord and the rubber body and x+y is 5/6 or more and 1 or less.

6 Claims, 4 Drawing Sheets

(52) U.S. Cl.
CPC .... *D07B 1/0666* (2013.01); *B60C 2009/0014* (2013.01); *D07B 2201/2087* (2013.01); *D07B 2201/2092* (2013.01); *D07B 2205/3025* (2013.01); *D07B 2205/3067* (2013.01); *D07B 2205/3071* (2013.01); *D07B 2501/2046* (2013.01); *D10B 2505/022* (2013.01)

(58) Field of Classification Search
CPC ............ D10B 2505/022; D07B 1/0666; D07B 2205/3025; D07B 2205/3067; D07B 2205/3071; D07B 2201/2087; D07B 2201/2092; D07B 1/06; D07B 2205/3089; D07B 2501/2046
USPC ................ 428/195.1; 156/117; 152/451, 565
See application file for complete search history.

(56) References Cited

FOREIGN PATENT DOCUMENTS

| JP | 2002-013085 A | 1/2002 |
|----|---------------|--------|
| JP | 2002-205506 A | 7/2002 |
| JP | 2011-168713 A | 9/2011 |
| JP | 2014-019974 A | 2/2014 |
| WO | 2011076746 A1 | 6/2011 |
| WO | 2013-035805 A1 | 3/2013 |

OTHER PUBLICATIONS

Lukasiewicz, et. al., "ZnO, ZnMnO and ZnCoO films grown by atomic layer deposition" Semicond, Sci. Technol. 27 (2012) 074009 (14pp), IOP Publishing [Cited in Spec].

Guy Buytaert et al.: "Study of Cu—Zn—Co ternary alloy-coated steel cord in cobalt-free skim compound", Journal of Adhesion Science and Technology, vol. 28, No. 16, Apr. 9, 2014 (Apr. 9, 2014), pp. 1545-1555 [Cited in EESR issued May 9, 2019 in the corresponding EP Application].

W.J. Van Ooij et al.: "Application of XPS to the Study of Polymer-Metal Interface Phenomena", Applications of Surface Science, vol. 4, Jan. 1, 1980 (Jan. 1, 1980), XP055558786, p. 334, paragraph 2—p. 336, last paragraph [Cited in EESR issued May 9, 2019 in the corresponding EP Application].

\* cited by examiner

TIRE

TECHNICAL FIELD

The present invention relates to a tire.

BACKGROUND ART

In Patent Document 1 and the like, there is known a tire for automobiles in which a steel cord is embedded in a rubber boy. Patent Document 1 proposes a technique of improving initial adhesiveness by incorporating Co into a surface layer region of the steel cord.

BACKGROUND ART DOCUMENTS

Patent Documents

Patent Document 1: JP-A-2002-13085

Non-Patent Documents

Non-Patent Document 1: "ZnO, ZnMnO and ZnCoO films grown by atomic layer deposition" Semicond. Sci. Technol. 27 (2012) 074009 (14 pp), TOP PUBLISHING, M I Lukasiewicz et al.

SUMMARY OF THE INVENTION

Problems that the Invention is to Solve

For such a steel cord, in addition to the initial adhesiveness to rubber, moist heat resistance is required. When high temperature repeatedly acts on a tire, moisture, the rubber, and the steel cord react to lower adhesive strength between the rubber and the steel cord. Durability against aged deterioration caused by the repeatedly acting moisture and heat is called moist heat resistance.

An object of the present invention is to provide a tire excellent in the initial adhesiveness and the moist heat resistance.

Means for Solving the Problems

According to the present invention,
there is provided a tire having a rubber body in which a steel cord is embedded, wherein
a layer composed of $Zn_xCo_yO$ is formed at the interface between the steel cord and the rubber body and x+y is 5/6 or more and 1 or less

Advantage of the Invention

According to the present invention, there is provided a tire excellent in both of initial adhesiveness and moist heat resistance.

SUMMARY OF EMBODIMENTS OF THE INVENTION

First, summary of the embodiments of the present invention will be described.

One embodiment of the tire according to the invention (1) is a tire having a rubber body in which a steel cord is embedded, wherein
a layer composed of $Zn_xCo_yO$ is formed at the interface between the steel cord and the rubber body and x+y is 5/6 or more and 1 or less.

(2) In the tire according to the above embodiment,
the steel cord may have a steel wire and a plating layer containing Cu and Zn provided on the steel wire and
Co may be contained in the plating layer.

(3) In the tire according to the above embodiment,
Co may be exposed on the surface of the plating layer of the steel cord.

(4) In the tire according to the above embodiment,
Co may be contained in the rubber body.

Details of Embodiments of the Invention

The following will describe examples of embodiments of the tire according to the present invention, with reference to drawings. Incidentally, it is intended that the invention should not be construed as being limited to these examples and includes all changes shown by Claims or falling within meanings and scopes equivalent to Claims.

Figure 1:
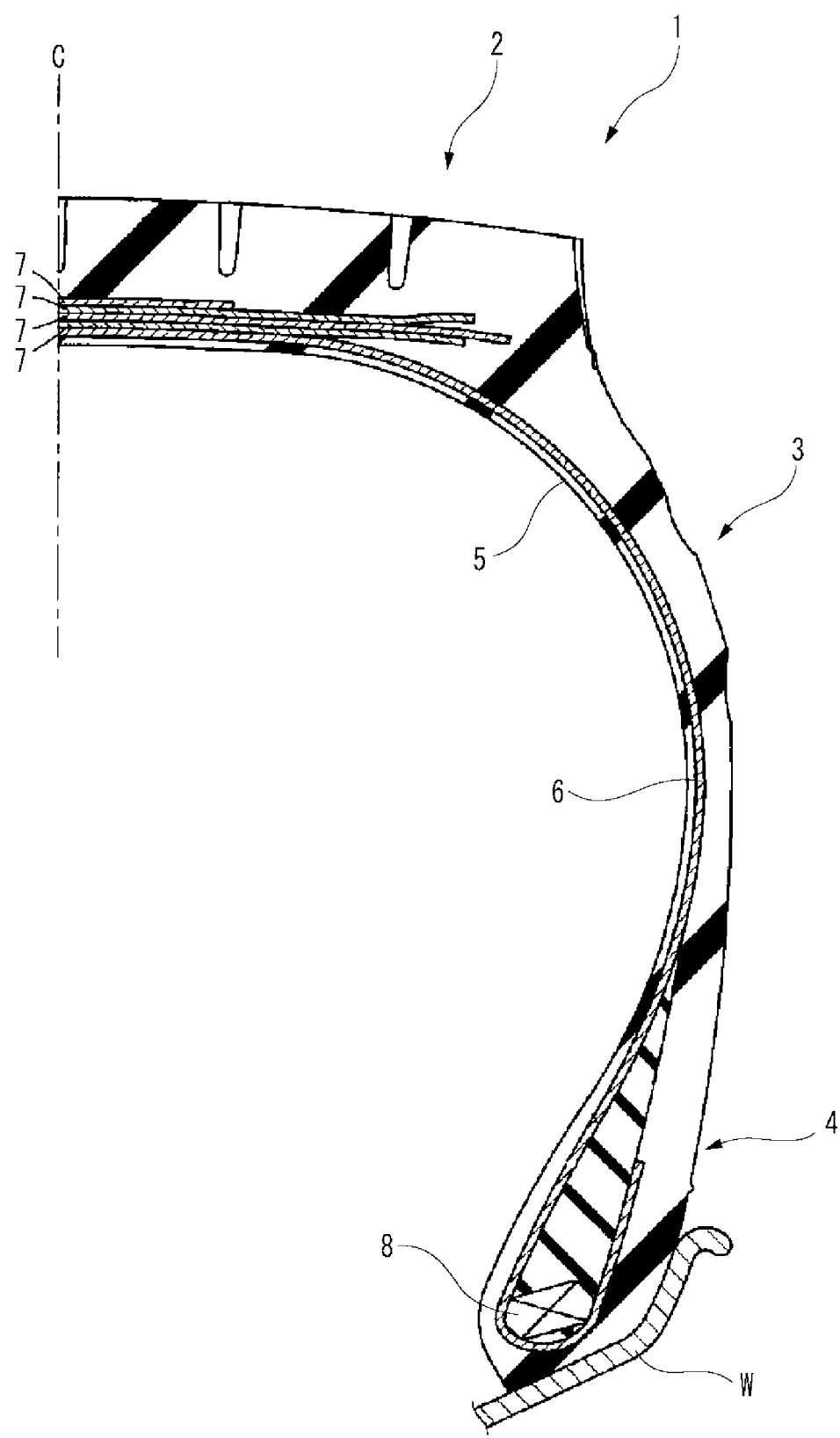
FIG. 1 is a cross-sectional view of a tire according to an embodiment of the present invention.

FIG. 1 is a cross-sectional view of a tire 1 according to an embodiment of the invention. As shown in FIG. 1, the tire 1 comprises a tread part 2, a sidewall part 3, and a bead part 4.

The tread part 2 is a part that comes into contact with a road surface. The bead part 4 is disposed on an inner diameter side relative to the tread part 2. The bead part 4 is a part that comes into contact with a rim of a wheel W of a vehicle. The sidewall part 3 connects the tread part 2 and the bead part 4. When the tread part 2 receives impact from a road surface, the sidewall part 3 elastically deforms to absorb the impact.

Moreover, the tire 1 comprises an inner liner 5, a carcass 6, a belt 7, and a bead wire 8.

The inner liner 5 is composed of rubber and tightly closes a space between the tire 1 and the wheel W.

The carcass 6 forms a skeleton of the tire 1. The carcass is composed of an organic fiber such as polyester, nylon, or rayon and rubber.

The belt 7 fastens the carcass 6 to increase rigidity of the tread part 2. The belt 7 is composed of a steel cord and rubber. In the example shown in the figure, the tire 1 has four layers of the belt 7.

The bead wire 8 is disposed in the bead part 4. The bead wire 8 is one obtained by twisting steel wires together and covering them with rubber. The bead wire 8 receives a tensile force that acts on the carcass 6.

For the steel cord 10 constituting the belt 7, initial adhesiveness to rubber such as butadiene rubber and moist heat resistance are required. Incidentally, in the following explanation, rubbery parts constituting the tire 1 are collectively called a rubber body. In the rubber body, a steel cord 10 is embedded.

When rubber is topped on the steel cord 10 and subjected to a crosslinking reaction, the rubber closely adhered to the steel cord 10. The adhesive strength between the rubber body and the steel cord 10 when the crosslinking reaction is accomplished is called initial adhesiveness.

At the time of using the tire 1, the moisture that has entered into the tire 1 acts on the steel cord 10 and the rubber body to gradually lower the adhesive strength between the steel cord 10 and the rubber body. Particularly, in the case where the tire 1 is used in a high-temperature and high-humidity area, there is a concern that the high temperature and the high humidity repeatedly act on the tire 1 to promote the lowering of the adhesive strength between the steel cord 10 and the rubber body. Such deterioration of the adhesive strength increases with time and is promoted under a high-temperature and high-humidity environment.

Durability against the lowering of the adhesive strength caused by the repeatedly acting heat and moisture is called moist heat resistance.

As for the tire according to the present embodiment, as mentioned above, the steel cord 10 is embedded in the rubber body at the belt 7 and the bead wire 8. In the steel cord 10 according to the present embodiment, a layer composed of $Zn_xCo_yO$ is formed at the interface between the steel cord 10 and the rubber body.

Figure 2:
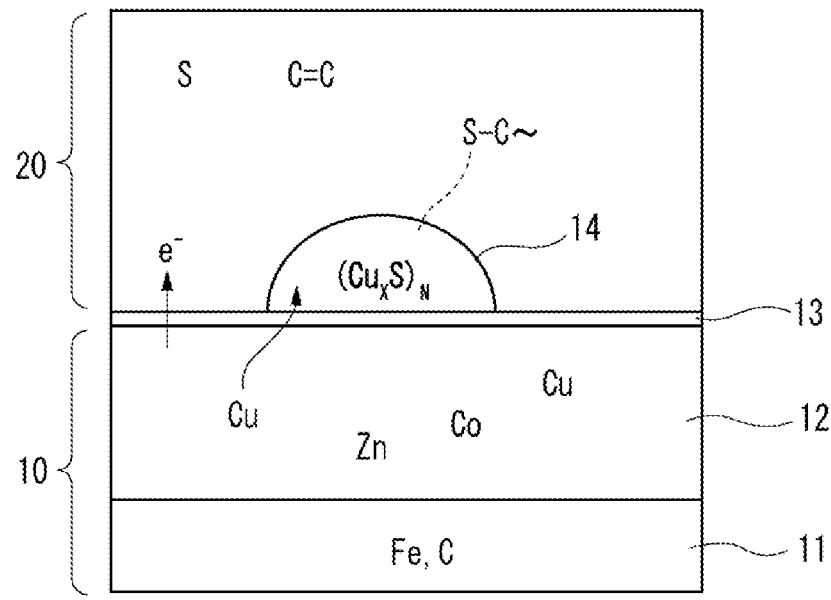
FIG. 2 is a schematic cross-sectional view showing a state of the interface between a steel cord and a rubber body of a tire according to a reference example.

FIG. 2 is a schematic cross-sectional view showing a state of the interface between a steel cord 10 and a rubber body 20 of a tire 1 according to a reference example. As shown in FIG. 2, the steel cord 10 comprises a steel wire 11 and a plating layer 12 provided on the surface of the steel wire 11. In the plating layer 12, Cu, Zn, and Co are contained. In the rubber body 20, S is contained besides a carbon unsaturated bond.

Incidentally, an extremely thin ZnO film 13 is formed between the rubber body 20 and the plating layer 12. The ZnO film 13 functions as a sacrificial oxide film of Cu and Fe and does not inhibit electron conduction of $e^-$ and diffusive migration of Cu etc. $(Cu_xS)_n$ represented by a sign 14 is formed between the rubber body 20 and the ZnO film 13 and it is considered that $(Cu_xS)_n$ holds carbon and Cu in the rubber body 20 to contribute adhesiveness.

Figure 3:
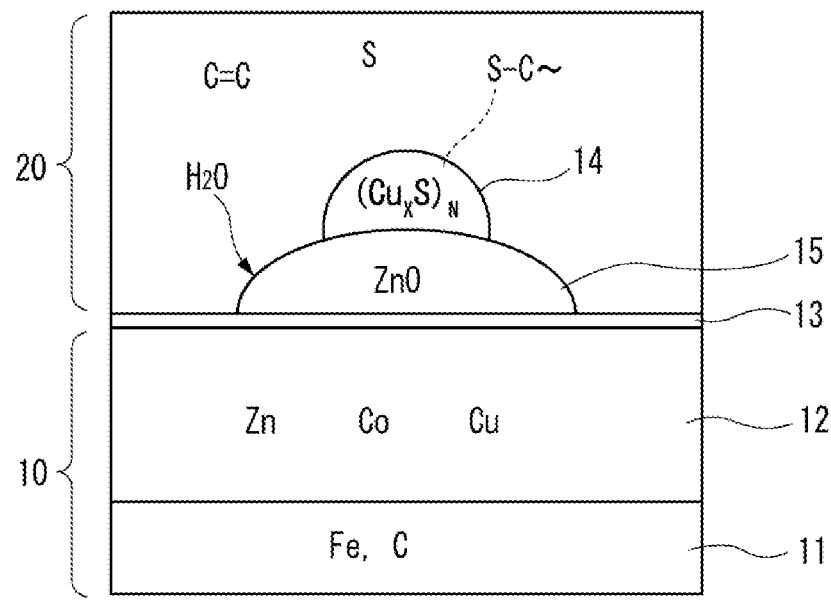
FIG. 3 is a schematic cross-sectional view showing a state of the interface between a steel cord and a rubber body of a tire according to a reference example.

As shown in FIG. 3, moisture ($H_2O$) penetrates though the rubber body 20, and Zn contained in the plating layer 12 and $H_2O$ react with each other to form ZnO represented by a sign 15. The ZnO 15 is formed between the ZnO film 13 and $(Cu_xS)_n$ 14. The ZnO 15 is brittle and it is not expected to hold the plating layer 12 and the rubber body 20. That is, since thick ZnO 15 is formed between $(Cu_xS)_n$ 14, which has held the plating layer 12 and the rubber body 20, and Cu of the plating layer 12, the adhesiveness between the rubber body 20 and the plating layer 12 decreases. Under a high-temperature and high-humidity environment, it is considered that such a reaction is promoted and thus the adhesiveness decreases.

Figure 4:
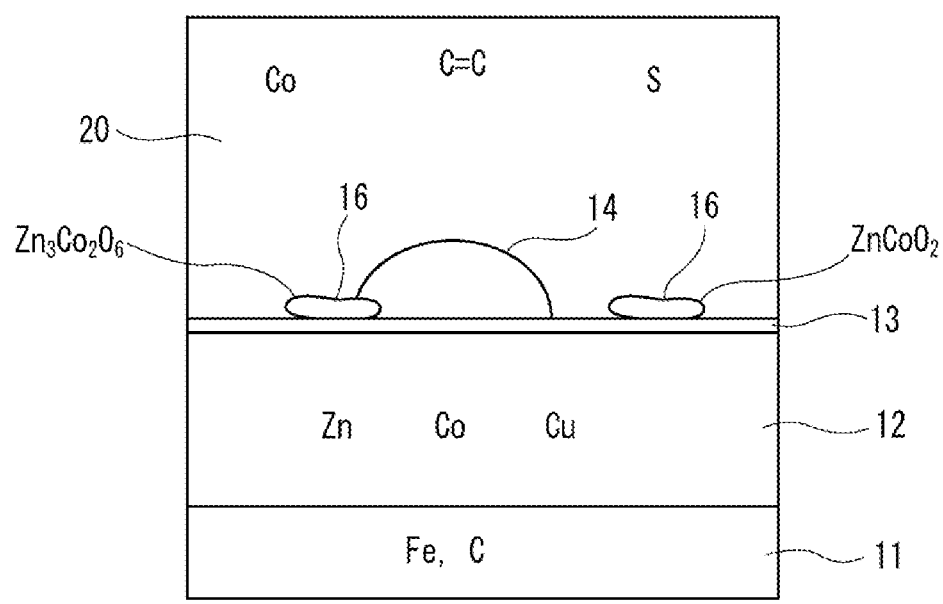
FIG. 4 is a schematic cross-sectional view showing a state of the interface between a steel cord and a rubber body of a tire according to an embodiment of the present invention.

FIG. 4 is a schematic cross-sectional view showing a state of the interface between the steel cord and the rubber body of the tire according to the present embodiment. In the present embodiment, it is devised that, by incorporating Co into the plating layer 12 or the rubber body 20, a composition 16 where a part of Zn of the ZnO film 13 is replaced with Co is formed between the ZnO film 13 and $(Cu_xS)_n$ 14.

A Co component contained in plating is oxidized in part under an environment of moist heat deterioration to form $Co^{2+}$ or $Co^{3+}$ but the composition 16 is formed through the replacement with $Zn^{2+}$ in the ZnO film 13 so as to balance the valency. When the composition 16 is represented as $Zn_xCo_yO$, x+y becomes 5/6 or more and 1.00 or less.

According to the tire 1 of the present embodiment, by the presence of $Zn_xCo_yO$ formed at the interface between the steel cord 10 and the rubber body 20, the formation of ZnO caused by $H_2O$ is inhibited and thus the adhesiveness between the plating layer 12 and the rubber body 20 by the action of $(Cu_xS)_n$ 14 is satisfactorily maintained.

Here, Co takes the form of $Co^{2+}$ or $Co^{3+}$. When $Co^{3+}$ is replaced with a part of Zn of ZnO, $Zn_3Co_2O_6$ is formed. When $Co^{2+}$ is replaced with a part of Zn of ZnO, $ZnCoO_2$ is formed. Therefore, it is considered that $Zn_xCo_yO$ formed at the interface between the steel cord 10 and the rubber body 20 has intermediate composition between $Zn_{(3/6)}Co_{(2/6)}O$ and $Zn_{(1/2)}Co_{(1/2)}O$ when O (oxygen) is thought to be 1. Accordingly, it is considered that x+y becomes a value between 5/6 (=3/6+2/6) and 1 (=1/2+1/2).

Incidentally, Co may be contained in the plating layer 12 of the steel cord or may be contained in the rubber body 20. Co may be exposed on the surface of the plating layer 12 of the steel cord 10. In this case, as compared with the case where Co is buried in the inside of the plating layer 12, the adhesiveness between the plating layer 12 and the rubber body 20 can be satisfactorily maintained by a small amount of Co. In the case where Co is contained in the rubber body 20, the tire 1 can be manufactured using an inexpensive steel cord containing no Co.

The presence of $Zn_xCo_yO$ can be confirmed by using an absorption-type XAFS (X-ray Absorption Fine Structure). The XAFS is known in Non-Patent Document 1 etc.

Figure 5:
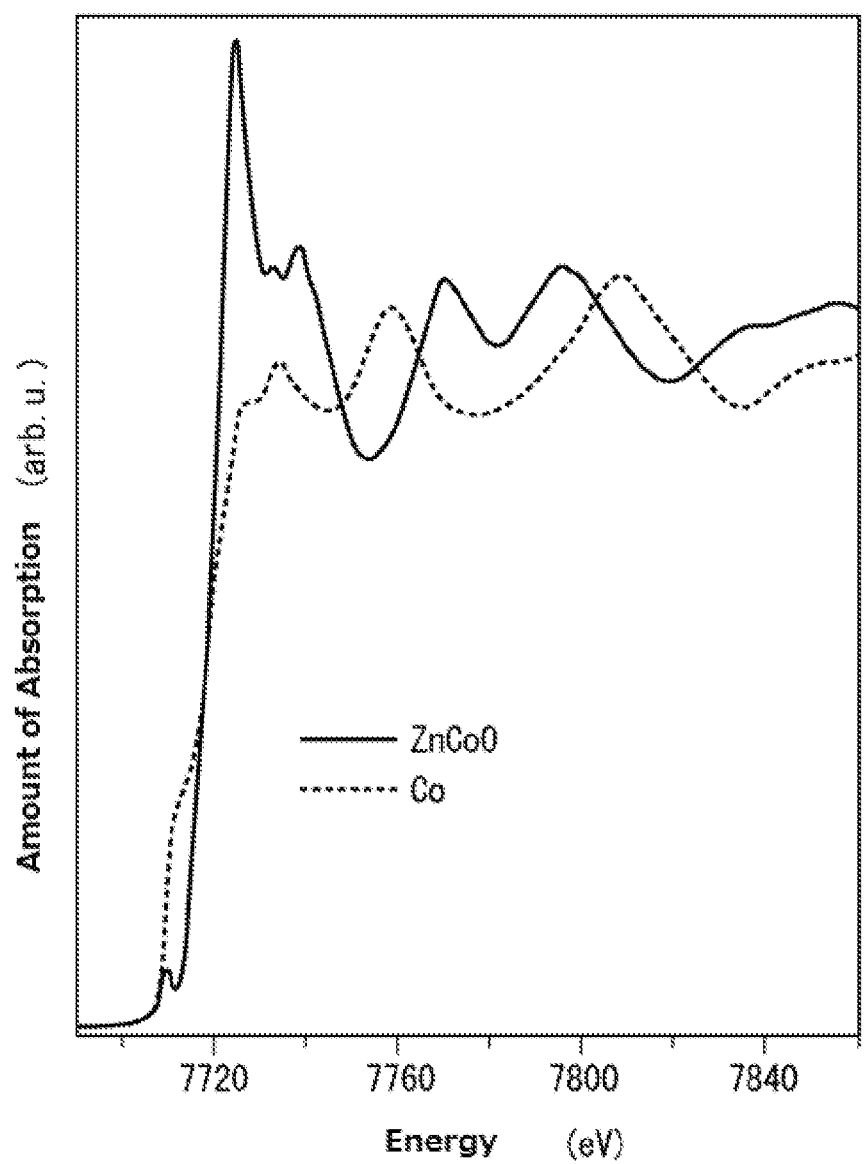
FIG. 5 shows spectra obtained by XAFS in the case where $Zn_xCo_yO$ is present on the surface of a sample.

FIG. 5 shows spectra obtained by the XAFS in the case where $Zn_xCo_yO$ is present on the surface of a sample. In FIG. 5, the solid line represents a spectrum resulting from $Zn_xCo_yO$ and a broken line represents a spectrum resulting from Co. The shape of the spectrum obtained by the XAFS is different depending on composition.

When a spectrum is observed on the composition 16 having $Zn_xCo_yO$ of the tire 1 according to the present embodiment using the XAFS, as shown in FIG. 5, peaks are observed at around 7724 eV, around 7738 eV, and around 7770 eV.

The present application is based on Japanese Patent Application No. 2015-204895 filed on Oct. 16, 2015, and the contents are incorporated herein by reference.

DESCRIPTION OF REFERENCE NUMERALS AND SIGNS

1 Tire
2 Tread part
3 Sidewall part
4 Bead part
5 Inner liner
6 Carcass
7 Belt
8 Bead wire
10 Steel cord
11 Steel wire
12 Plating layer
13 ZnO film
14 $(Cu_xS)_n$
15 ZnO
16 Composition
20 Rubber body

The invention claimed is:

1. A tire having a rubber body in which a steel cord is embedded, wherein a layer composed of $Zn_xCo_yO$ is formed at the interface between the steel cord and the rubber body and x+y is 5/6 or more and 1 or less.

2. The tire according to claim 1, wherein the steel cord has a steel wire and a plating layer containing Cu and Zn provided on the steel wire and
Co is contained in the plating layer.

3. The tire according to claim 2, wherein Co is exposed on the surface of the plating layer of the steel cord.

4. The tire according to claim 1, wherein Co is contained in the rubber body.

5. The tire according to claim 1, wherein the layer composed of $Zn_xCo_yO$ is at least partially in between a ZnO film and a copper sulfide layer.

6. A tire having a rubber body in which a steel cord is embedded,
wherein the steel cord has a steel wire and a plating layer containing Cu and Zn provided on the steel wire,
wherein Co is contained in the plating layer,
wherein a layer of composition which is composed of $Zn_xCo_yO$ is formed at the interface between the steel cord and the rubber body,
wherein a ZnO film is formed between the rubber body and the plating layer,
wherein a Co component contained in plating layer is oxidized in part under an environment of moist heat deterioration to form $Co^{2+}$ or $Co^{3+}$ and the composition is formed through the replacement with $Zn^{2+}$ in the ZnO film so as to balance the valency, and
wherein x+y is 5/6 or more and 1 or less.

* * * * *